United States Patent [19]

Ihara et al.

[11] 4,385,553
[45] May 31, 1983

[54] APPARATUS FOR SEPARATING LIQUID AND RESIDUAL SOLIDS

[75] Inventors: Keisuke Ihara, Kasukabe; Atsushi Takayama; Susumu Tanioka, both of Yokohama; Kazuo Toda; Akiyosi Sasaki, both of Tokyo; Shoji Hoshino, Sagamihara, all of Japan

[73] Assignee: Tokyo Electric Co., Ltd., Tokyo, Japan

[21] Appl. No.: 226,778

[22] Filed: Jan. 21, 1981

[30] Foreign Application Priority Data

Jan. 21, 1980 [JP]  Japan .................................. 55-6125
Jan. 21, 1980 [JP]  Japan .................................. 55-6126
Jan. 21, 1980 [JP]  Japan .............................. 55-6302[U]
Jan. 21, 1980 [JP]  Japan .............................. 55-6310[U]

[51] Int. Cl.³ .............................................. A23N 1/02
[52] U.S. Cl. ...................................... 99/510; 99/495; 100/117; 100/145; 366/88; 366/319
[58] Field of Search ................. 99/348, 483, 495, 509, 99/510, 513; 100/117, 147, 145, 148; 425/207, 208, 198; 241/260.1; 366/81, 88–90, 318, 319, 322–324; 210/173, 174, 405, 450

[56] References Cited

U.S. PATENT DOCUMENTS

| | | | |
|---|---|---|---|
| 220,112 | 9/1879 | Baker | 99/513 |
| 2,109,398 | 2/1938 | McNitt | 99/513 X |
| 2,315,028 | 3/1943 | Thomas | 99/513 |
| 2,701,518 | 2/1955 | McDonald | 100/117 |
| 3,762,693 | 10/1973 | DeBoo et al. | 366/81 |
| 3,943,033 | 3/1976 | Wallen | 100/117 |

*Primary Examiner*—Philip R. Coe
*Assistant Examiner*—Timothy F. Simone
*Attorney, Agent, or Firm*—James E. Nilles

[57] ABSTRACT

Apparatus for separating the juice and pulp of fruit or vegetable material comprises a base incorporating a drive mechanism, a case attached to the base and having a conical bore with the axis thereof extending horizontally between end walls of the case, a rotary member rotatably mounted in the case and driven by the drive member, the rotary member comprising a cutting blade portion and a pressing portion. The case is provided on its upper side near the wide end of the bore with a material inlet opening, on its lower side with a liquid outlet opening having a filter therein, and on a lateral side near the narrow end of the bore with a residual solids outlet opening. The cutting blade portion is spiral and has portion disposed near and confronting the material inlet opening. The pressing portion is conical (but oppositely disposed to the conical bore) and has portions disposed near and confronting both the liquid outlet opening and the residual solids discharge opening.

2 Claims, 22 Drawing Figures

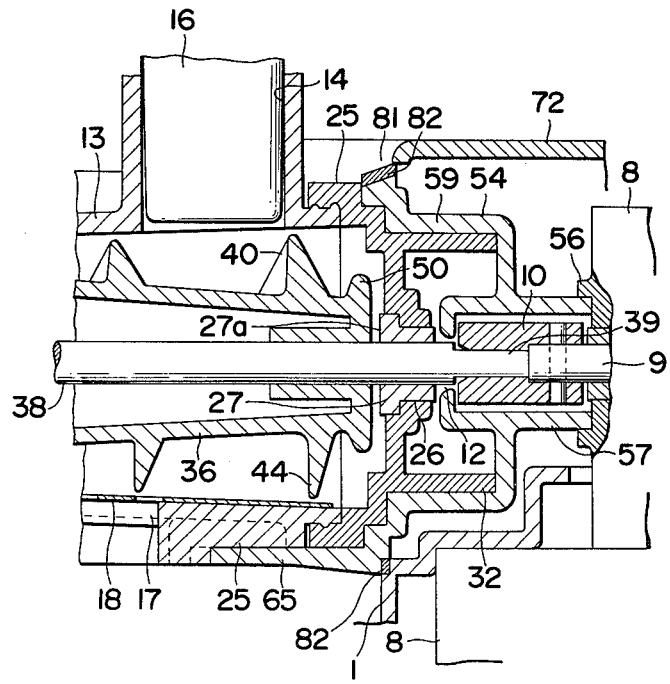
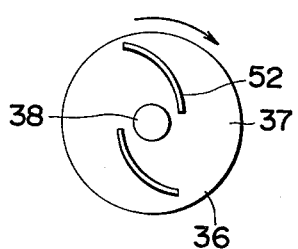
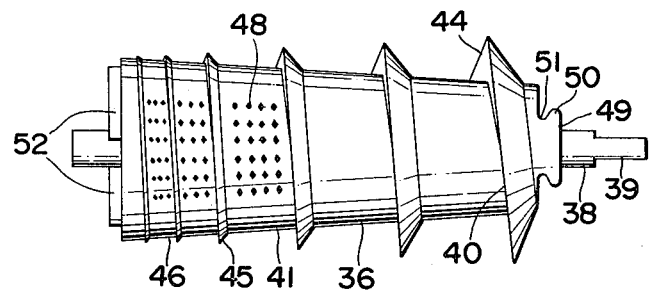
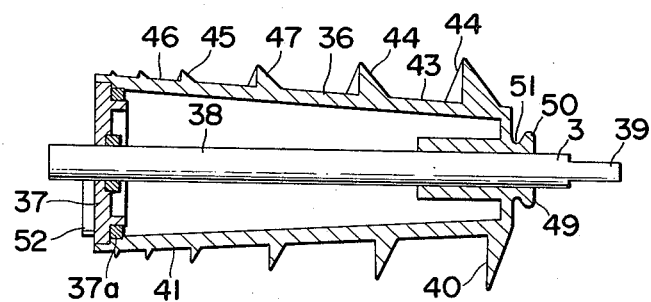

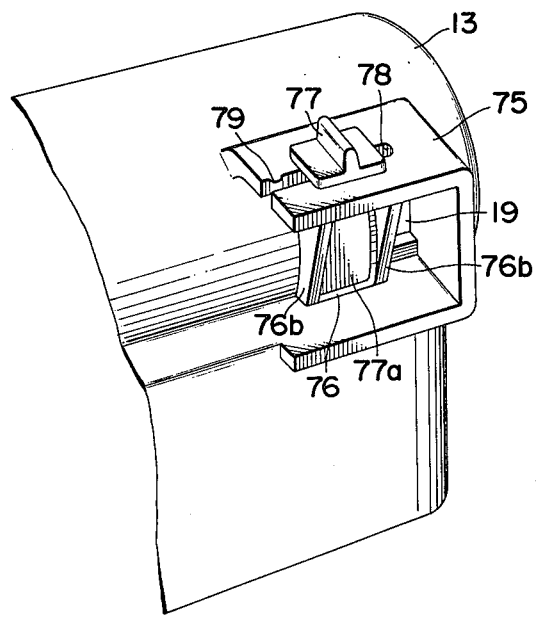
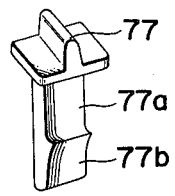
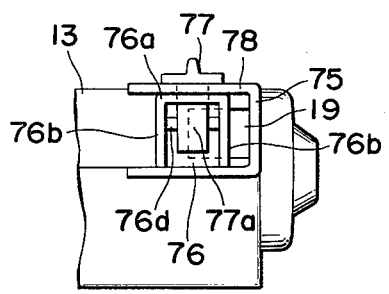
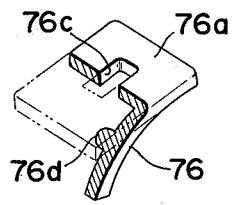
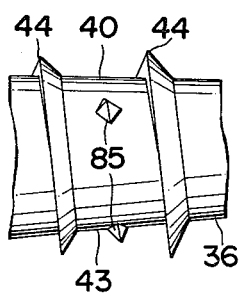
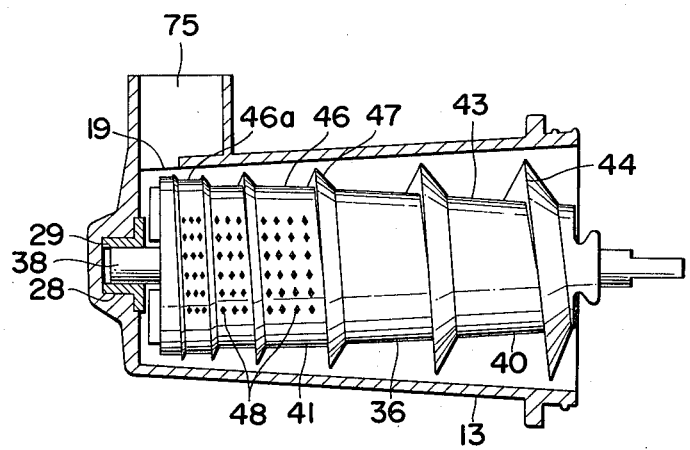

APPARATUS FOR SEPARATING LIQUID AND RESIDUAL SOLIDS

BACKGROUND OF THE INVENTION

1. Field of the Invention

The present invention relates to food processing apparatus and, more particularly, to juicer apparatus having a spiral rotary blade and a pressing portion and adapted to cut and squeeze material, such as fruits and vegetables to extract juice and residual matter from the latter material.

2. Description of the Prior Art

A typical known type of juicer apparatus has a disc-shaped rotary blade adapted to be rotated at a high speed and a centrifugal separating cage surrounding the rotary blade and adapted to rotate unitarily with the latter. The material to be processed is pressed by a pushing rod against the rotary blade which is rotating at a high speed together with the centrifugal separating cage, so that the liquid content or juice of the material is expelled by centrifugal force through small holes in the centrifugal separating cage, while the residual solid content of the material is moved and discharged upward along the inner peripheral surface of the centrifugal separating cage.

In this known type of juicer, it is necessary to rotate the blade and the cage at a high speed of 10,000 r.p.m. or higher, in order to obtain a centrifugal force large enough to extract the juice. In addition, the centrifugal separating cage has a very large diameter and produces loud noise during rotation. In addition, the rotary members have to be fabricated to exhibit a good balance of mass. The rotary blade rotating at a high speed produces a loud noise when it cuts and crushes the material, so that the level of noise generated by the juicer as a whole is impractically high.

In addition, the solid residual matter tends to attach to the inner peripheral surface of the centrifugal separating cage. The balance of the rotary body often fails due to uneven attaching of the residual matter to further increase vibration of the apparatus. Furthermore, air is trapped by the juice from the crushed material as the juice flows through the small holes of the cage thus permitting the juice to contain air bubbles which cause an undesirably easy separation of pulp from the water. In addition, the vitamin constituents are liable to be broken down due to the contact with air, thus diminishing the nutritive power.

Another problem is that the residual solid matter attaches to the centrifugal separating cage, case, lid and other parts. Particularly, the fibrous content of the residual solid matter enters into the small holes in the centrifugal separating cage. Troublesome work is required to remove and wash away this residual solid matter after use.

Japanese Utility Model Application Publication Nos. 1990/1954 and 1193/1959 disclose different juicers having spiral rotary blades. In these known juicers, the spiral rotary blade presses and squeezes the material while transferring the same. The cutting and crushing of the material is largely owed to the mutual cutting effect of the material. Therefore, the material is often wasted before the juice is fully extracted, so that the nutritive value due to pulp contained by the juice is reduced.

Under these circumstances, the present inventors have proposed a juicer comprising a rotary member having a spiral inlet cutting portion for effecting cutting of the material and a spiral pressing portion connected to the cutting portion, a cylindrical squeezing case rotatably accomodating the rotary member and a filter attached to the lower side of the squeezing casing.

In operation, the material to be processed is, thrown into the juicer through an inlet, is cut and pressed by the rotary member and is shifted toward the outlet end while releasing the juice from a juice outlet, so that juice having a high nutritive value is produced.

In this juicer, however, it is not possible to provide the bearing of the rotary member at the end of the squeezing case, because the juice outlet and the residual matter outlet are formed at the end of the case. This inconveniently prevents the clearance between the outer end of the blade of the rotary member and the inner peripheral surface of the case from being reduced to a sufficiently small level, so that the material to be processed is crushed only coarsely, thereby resulting in a low efficiency of squeezing. In addition, it is necessary to place a receiver for receiving residual matter at the end of the squeezing case, so that the size of the juicer as a whole is increased impractically.

SUMMARY OF THE INVENTION

The present invention has been accomplished in view of the problems of the prior art explained heretofore. According to the invention, the residual matter outlet is provided at one side of the end of the squeezing portion and the residual matter receiver is placed at one side of the case so as to confront the residual matter outlet, thereby to enable the location of the bearing at the end of the casing. Consequently, the clearance between the spiral blade of the rotary member and the inner peripheral surface of the squeezing casing is sufficiently reduced to permit increase of the crushing and squeezing effects. In addition, since the residual matter receiver is placed at one side of the case, the whole height of the juicer is reduced. Furthermore, since the residual matter outlet is formed at one side of the end of the case, it is possible to completely close the end surface of the squeezing casing. This permits the bearing of the rotary member to be placed at the center of the squeezing case to make it possible to reduce the annular clearance between the inner peripheral surface of the squeezing case and the spiral blade of the rotary member to enhance the crushing and squeezing effects. In addition, since the material is pressed against the closed end of the squeezing case before it is discharged, the squeezing effect is further enhanced. In addition, since the residual matter receiver is placed at one side of the squeezing case to confront the residual matter outlet formed at one side of the case end, the whole construction is made compact and small-sized.

If the material crushed at the pressing and squeezing portion of the rotary member is successively transferred at a constant pitch, the squeezing effect gradually decreases as the material moves toward the outlet, because, in spite of the gradually reduced volume of the residual matter, the volume of the space between adjacent ridges of the spiral blade is not changed. In view of this fact, the pitch of the spiral blade of the rotary member is successively decreased toward the outlet end, so that the volume of the space between adjacent ridges is gradually decreased. In consequence, the rate of feed of the material is gradually decreased as the material moves toward the outlet to obtain a longer squeezing time and larger squeezing force.

In addition, since the material to be processed is pressed by a progressively increasing pressing force as it is fed by the rotary member, the crushing of the material into finer pieces is promoted to increase the efficiency of feed of fine particles of the material. In addition, since the material is crushed progressively, i.e. not at one time, the load imposed on the motor is stabilized and the squeezing case is relieved from excessive burden.

Furthermore, according to the invention, the annular gap between the rotary member and the inner peripheral surface of the squeezing case is gradually reduced toward the end of the case, so as not to allow the juice to remain in the residual matter to sufficiently extract the juice.

According to the invention, furthermore, projections are formed on the bottom of valleys or grooves between the adjacent ridges of the spiral blade, so as to further crush the material to promote the extraction of the juice, thereby to permit an efficient use of the material to be processed.

BRIEF DESCRIPTION OF THE DRAWINGS

FIG. 9 is a vertical sectional view of the squeezing case shown in FIG. 7;

FIG. 10 is a front elevational view of a rotary member incorporated in the apparatus shown in FIG. 1;

FIG. 11 is a longitudinal sectional view of the rotary member shown in FIG. 10;

FIG. 12 is a side elevational view of the rotary member shown in FIG. 10;

FIG. 13 is a perspective view showing the back side of the residual matter outlet portion of the squeezing case;

FIG. 14 is a back side elevational view of the portion shown in FIG. 13;

FIG. 15 is a perspective view of the adjusting plate and the knob;

FIG. 16 is a perspective view of the squeezing case of another embodiment;

FIG. 17 is a front elevational view of the cutting portion of the rotary member in accordance with another embodiment of the invention;

DETAILED DESCRIPTION OF THE PREFERRED EMBODIMENTS

Hereinafter, the preferred embodiments of the invention will be described with reference to the accompanying drawings.

Figure 1:
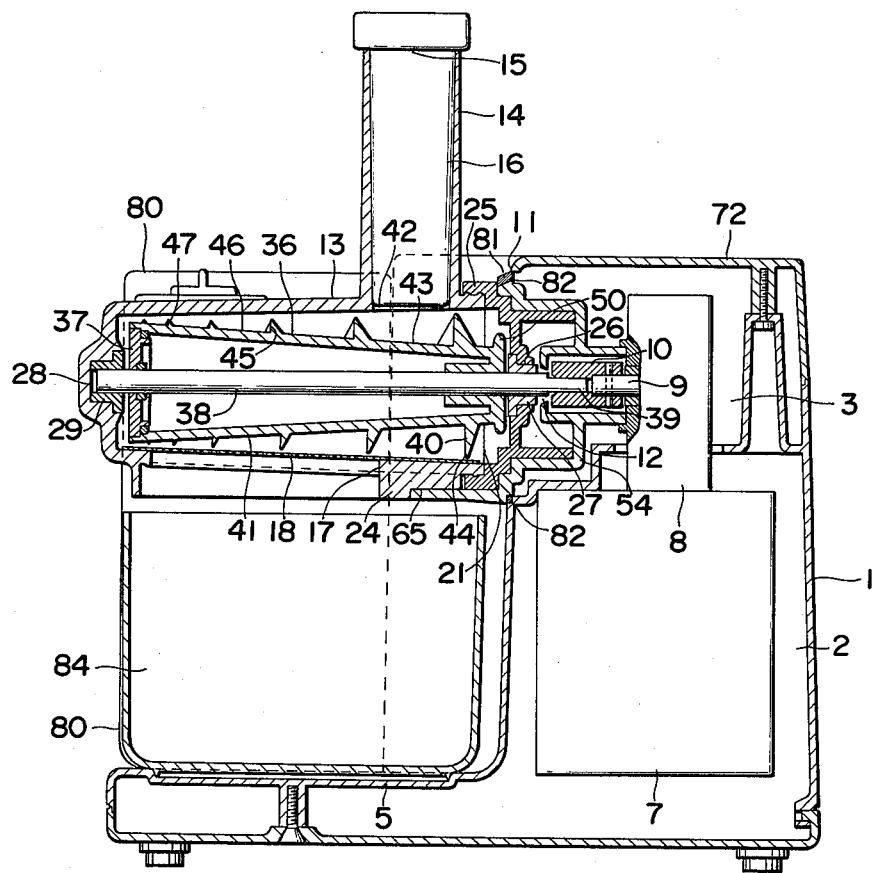
FIG. 1 is a longitudinal sectional view of a food processing apparatus constructed in accordance with an embodiment of the invention.
Figure 2:
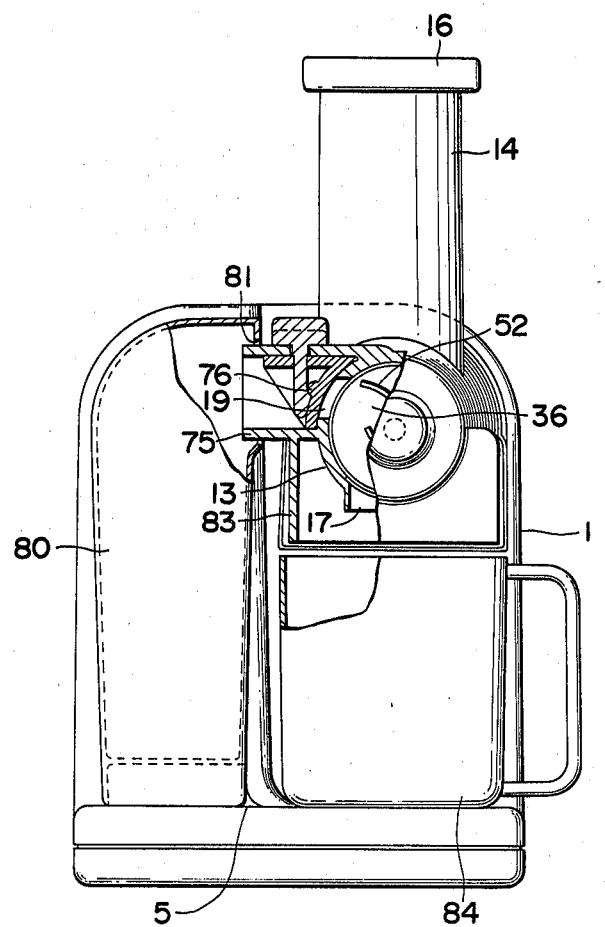
FIG. 2 is a side elevational view of the apparatus shown in FIG. 1.
Figure 3:
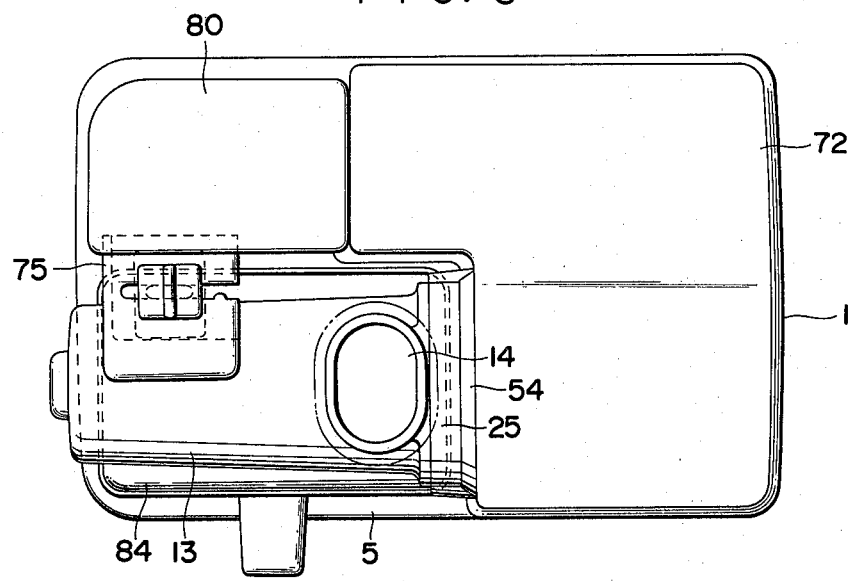
FIG. 3 is a plan view.

Referring to FIGS. 1, 2 and 3 which are vertical sectional, side elevational and plan of views, respectively, apparatus constructed in accordance with one embodiment of the invention, reference numeral 1 denotes a base of the apparatus, in which is defined a motor section 2 and a transmission section 3 above the motor section. A platform 5 for placing a juice container and residual matter receiver is formed on a step provided at one side of the motor section 2. A reversible motor 7 is placed on the upper surface of the motor section 2 of the base 1, through the medium of a cushioning rubber which is not shown. A gear case 8 accommodates a reduction gear type transmission mechanism connected operatively to the motor 7 and placed on the latter, and is situated in the aforementioned transmission section 3. A drive shaft 9 projects horizontally from the gear case 8. The drive shaft 9 is provided at its one end with a coupling portion 10 which projects into a hole 12 formed in the side wall of the base 1 at a portion of the latter confronting the coupling portion 10.

Figure 4:
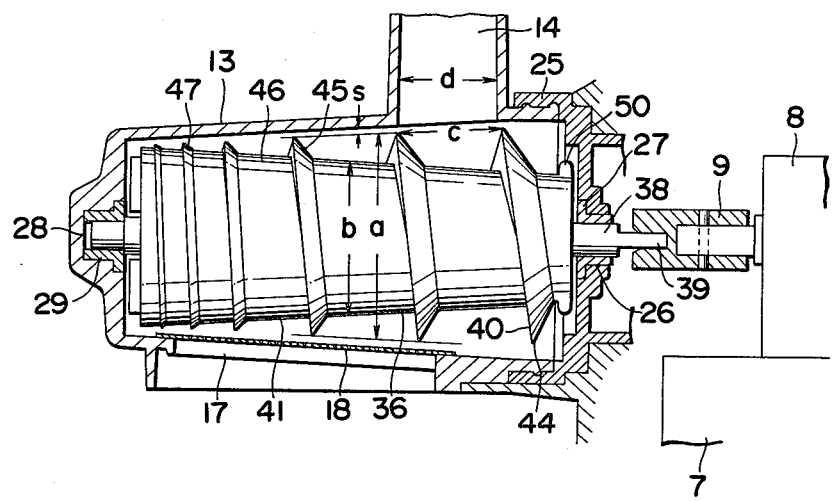
FIG. 4 is an enlarged sectional view of a squeezing case of the apparatus shown in FIG. 1.
Figure 5:
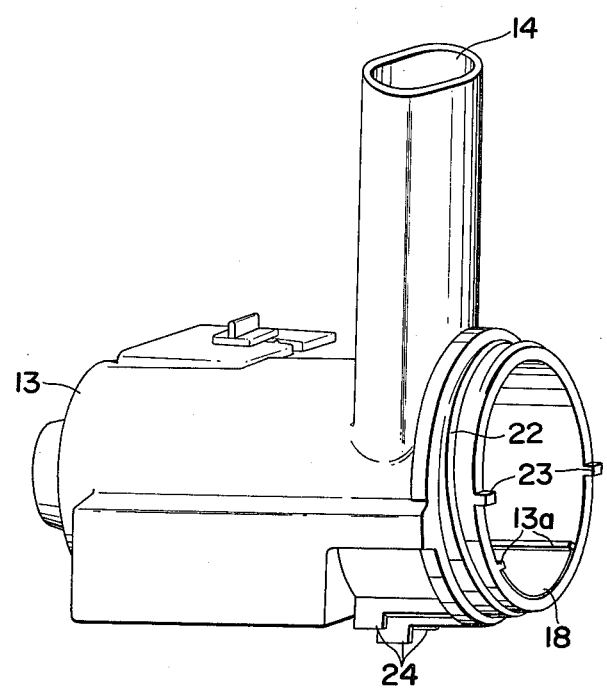
FIG. 5 is a perspective view of the squeezing case incorporated in the apparatus shown in FIG. 1.

FIGS. 4 and 5 are vertical sectional and perspective views, respectively of a squeezing case.

As will be seen from FIGS. 1, 2, 4 and 5, the squeezing case 13 is a substantially cylindrical member made of a plastic and having an inside diameter or conical bore gradually decreasing from the inlet end toward the discharge end thereof. The case 13 has a horizontally extending axis and is attached to the base 1 at its opened base end. A material inlet opening 14 is formed on the upper face or side of the base end of the case 13. The opening 14 has an upper end opening 15 through which a push rod 16 is retractably extended 16.

This material inlet opening 14 is positioned substantially at the center of the area of installation of the base 1 when the case 13 is attached to the base 1. A juice outlet opening 17 opens in the lower face or side of the case 13. A plurality of ribs 13a are formed on the inner peripheral surface of the case 13 so as to extend in the axial direction of the case 13 along the juice outlet opening 17. An arcuate tabular filter 18 having a multiplicity of openings is detachably secured to the juice outlet opening 17, along the inner peripheral surface of the case 13 and substantially flush with the latter, in such a manner as to be guided by the ribs 13a.

A residual matter outlet opening 19 is formed at the upper rear side of the end portion of the case 13 so as to extend substantially in the tangential direction to the inner peripheral surface of the case. The residual matter outlet opening 19 is positioned at a position circumferentially spaced from the juice outlet 17, so as to discharge the residual matter which has passed through the filter 18.

A screw portion 22 is formed in the periphery of the base end opening 21 of the case 13. Also, a locating projection 23 is formed at the end of the opening 21. In addition, a plurality of engaging projections 24 are formed at the bottom of the case 13.

Furthermore, a bearing recess 28 is formed at the center of the end of the case 13, so as to fittingly receive a bearing 29 which is made of a metal or a plastic.

A fitting sleeve 32 is formed concentrically on the outer end of the cover 25. An engaging step 32a is formed on the outer periphery of the fitting sleeve 32. A rotation prevention seat 33 is formed on each side surface of the fitting sleeve 32. An angular or polygonal clamp retainer hole 34 is formed in the rotation prevention stopper 33. Also, an inclined outwardly extending guide surface 34a is formed at a portion of the inner periphery of the retainer hole 34. A tapered engaging guide surface 35 is formed by cutting on the outer end of the rotation prevention seat 33.

Figure 6:
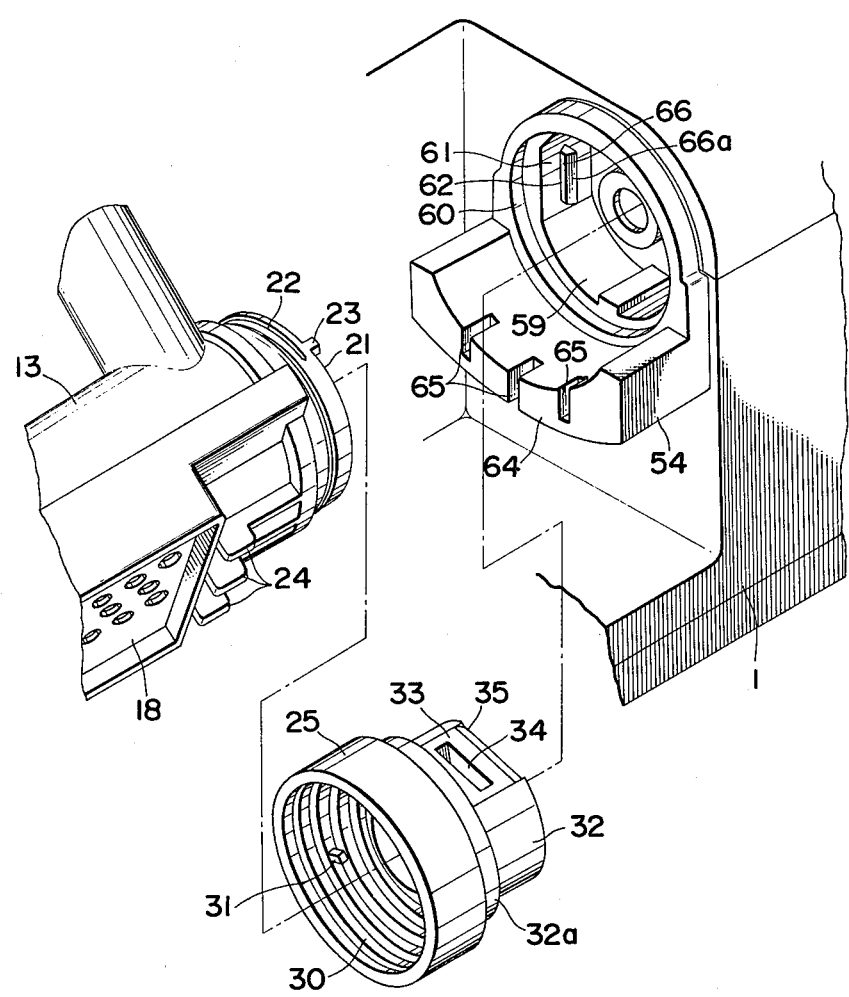
FIG. 6 is a perspective view of the squeezing case, lid and the base of the apparatus shown in FIG. 1 in the disassembled state.

Referring now to FIG. 6 which is an exploded perspective view of the squeezing case and the lid, the lid 25 is detachably screwed to the threaded portion 22 of the opening of the squeezing case 13, so that the case 13 is closed by this lid 25 in such a manner as to be able to be opened as desired.

A supporting hole 26 is formed at the center of the inner surface of the lid 25, so as to fittingly receive a bearing 27 made of a metal or a plastic.

A screw thread 30 for engaging the threaded portion 22 of the case 13 is formed on the inner surface of the lid 25. A locating projection 31 adapted for engagement with the projection 23 is formed on the screw thread 30 to project therefrom.

Referring now to FIGS. 10 and 11 which are a front elevational view and a vertical sectional view of a rotary member, the rotary member 36 has a hollow conical shape having a diameter which gradually increases toward one end thereof. The rotary member is made of plastic or metal.

A rotary shaft 38 extends through this rotary member 36 and projects at both its ends from an end plate 37 closing one end of the rotary member 36 and a base end portion of the latter. The projected ends of the rotary shaft 38 are rotatably carried by the aforementioned bearings 27, 29. A coupling portion formed at the base end of the rotary shaft 38 projects through hole 26 of the case 13 and releasably engages the coupling portion 10 of the drive shaft 9.

The end of the coupling portion 39 abuts the coupling portion 10 of the drive shaft 9. As the material to be processed is shifted toward the end of the case by the rotation of the rotary member 36, the latter is urged toward the base end side by the reactional force so that the end surface of the rotary member 36 may make contact with the bearing 27 to cause a wear. This, however, is prevented by the above-mentioned abutment of the coupling portion 39 and the coupling portion 10 which preserves a gap 27a between the bearing 27 and the rotary member 36. The center of the rotary member 36 substantially coincides with the center of the substantially conical inner surface of the case 13. A spiral cutting blade portion 40 and a spiral pressing portion 41 are formed on the periphery of the rotary member 36. The cutting blade portion 40 is located to confront the inlet opening 14 of the case 13, so that the material to be processed and inserted into the case through the opening 14 is ground and crushed by a cooperation between the cutting blade portion 40 and the opening edge 42 of the case 13.

The outside diameter of the valley between adjacent ridges of the cutting blade portion 40 is increased toward the end of the rotary member, so that the difference of diameter between the valley 43 and the crests 44 is decreased gradually toward the end of the rotary member.

The pressing portion 41 of the rotary member 36 has a spiral blade continuous from the cutting blade portion 40, so that the material to be processed is shitted toward the end of the rotary member 36 as the latter rotates in one direction. The outside diameter of the valley 46 between adjacent ridges of the spiral blade 45 is gradually increased, so that the difference between the diameter h of the valley 46 and the diameter a of the crests 47 is gradually decreased toward the end of the rotary member 36. In addition, the pitch of the spiral blade 45 forming the cutting blade portion 40 and the pressing portion 41 is gradually decreased toward the end of the rotary member 36.

A constant small gap is preserved between the outside diameter of the crests 44, 47 of the cutting blade portion 40 and the pressing portion 41, and the inner peripheral surface of the case 13, while the gap between the valleys 43, 46 of the cutting blade portion 40 and pressing portion 41, and the inner peripheral surface of the squeezing case 13 and the filter 18 is decreased gradually.

The pitch c of the crest 44 of the spiral blade of the cutting blade portion 40 beneath the material inlet opening 14 is slightly greater than the inside diameter of the inlet opening 14, so that, when material having a size substantially equal to the size of the opening 14 is thrown into the case, the material is received by the valley 43 between the crests 44 and is conveyed forwardly so as to be cut and crushed by a cooperation between the crests 44 of the cutting blade portion 40 and the edge of the lower opening of the inlet opening 14.

Furthermore, a plurality of small projections 48 of a height smaller than that of the crests 47 are formed on the bottoms of valleys 46 of the pressing portion 41 of the rotary member 36. The rotary member 36 has such a length that its base end portion projects from the opening of the case 13. The portion 49 projecting from the case 13 is provided with a finger-retaining recess 51 so as to constitute a knob portion 50. The knob portion 50 is positioned within and covered by the lid 25.

Referring to FIG. 12 showing a side elevation of the rotary member, the external surface of the end plate 37 of the rotary member 36 is provided with a plurality with residual matter extruding blades 52 adapted to extrude the residual matters radially outwardly as the rotary member 36 rotates. A slight gap is preserved between the extruding blades 52 and the inner end of the case 13.

Since the rotary member 36 is hollow, it is possible to avoid the fluctuation of size attributable to an extreme local concentration of material and shrinkage during molding, as compared with the solid rotary member, so that it is comparatively easy to maintain the high precision required for the gap s between the cutting blade portion 40 and the pressing portion 41, and the inner peripheral surface of the case 13, and it is possible to reduce the gap as much as possible.

In addition, the weight of the apparatus as a whole is reduced to facilitate the handling and to save the material cost.

The end plate 37 closing the end of the rotary member 36 is secured by welding or bonding through the medium of an annular seal of rubber or the like material.

The aforementioned ribs 13a of the squeezing case 13 has a height smaller than the aforementioned gap s.

Figure 7:
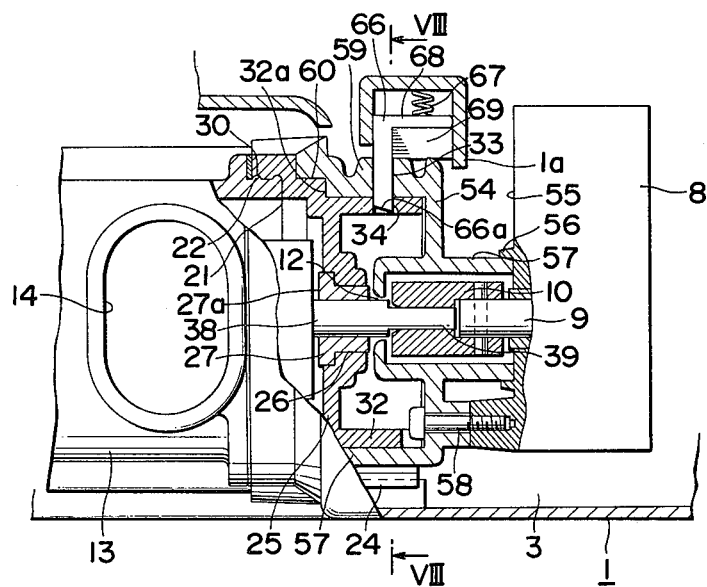
FIG. 7 is a plan view of the squeezing case with a clamp mechanism thereof being removed.
Figure 8:
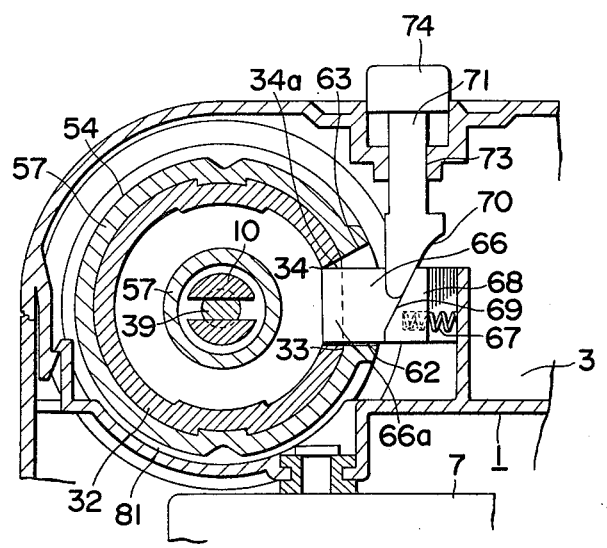
FIG. 8 is a longitudinal sectional view of the squeezing case shown in FIG. 7.

FIG. 7 is a plan view of a clamp mechanism for fastening the lid of the squeezing case and the base with a part thereof being removed, while FIG. 8 is a vertical sectional view of the clamp mechanism. The clamp mechanism for securing the lid 25 of the squeezing case 13 to the base 1 will be explained hereinunder with reference to FIGS. 6 to 8.

A reference numeral 54 designates a clamp case body provided with a fitting sleeve 57 adapted to fit an annular frame 56 formed on the outer surface of the side wall 55 of the gear case 8 concentrically with the outer periphery of the drive shaft 9. The aforementioned coupling portion 10 of the drive shaft is disposed within this fitting sleeve.

The clamp case body 54 is fixed to the side surface of the gear case 8 by means of a screw 58. The clamp case body 54 is provided with a tubular portion 59 formed integrally with the fitting sleeve 57 so as to fit the fitting sleeve 33 of the case 13. A step 60 having an increasing diameter for engaging an engaging step 32a of the fitting sleeve 32 is formed at the outer end of the inner periphery of the tubular portion 59.

At one side of the inner periphery of the tubular portion 59, formed is a rotation prevention engaging surface 61 adapted for engagement with the rotation prevention seat 33 of the fitting sleeve 32 of the lid 25. A clamp/guide hole 62 communicating with the aforementioned clamp retainer hole 34 is formed in this engaging surface 61. A guide surface 63 flush with the guide surface 34a is formed in this hole 62. At the end lower part of the clamp case 54, formed is a supporting bed 64 adapted to support the lower face of the throwing opening 14 in the case 13. Engaging recesses 65 for engagement with the engaging projections 24 are formed on the upper surface of the supporting bed 64.

A gap 81 is preserved between the clamp case 54 and the base 1. A packing 82 is placed in this gap 81 as shown in FIG. 1 so as to absorb the vibration of the motor 7 at the time of starting of the motor 7 and an abrupt change of load, thereby to prevent the vibration from being transmitted to the base 1. This, however, does not constitute essential part of the invention.

A reference numeral 66 denotes a clamp body retractably provided on the guide surface 1a of the base 1, and is biased toward the center by means of a coiled spring 67 interposed between the outer end of the clamp body 66 and the guide surface 1a. The clamp body 66 is adapted to be brought into and out of engagement with the retainer hole 34 of the lid 25, through the guiding hole 62 of the clamp case body 54. An engaging surface 66a adapted to be engaged by the lid 25 when the latter is fitted is formed at the end of the clamp body 66 at an inclination. At one side of the outer end of the clamp body 66, formed is operated projection 68. A releasing operated surface 69 inclined from the upper side toward the lower side is formed at the inner side of the operated projection 68. A releasing member 71 has an inclined operating surface 70 adapted to engage the releasing operated surface 69. This releasing member 71 is retractably fitted in the guide hole 73 formed in a case cover 72 covering the upper side of the base 1. A push button 74 is provided on the upper projected end of the releasing member 71.

In the described embodiment, the supporting bed 64 is formed on the clamp case body 54. The supporting bed 64, however, may be mounted on the base 1.

It is also possible to form the engaging recesses 65 and the engaging projections 24 on the squeezing case 13 and the clamp case body 54, respectively.

FIG. 13 is a perspective view of the residual matter outlet opening 19 of the squeezing case 13, while FIG. 14 is a front elevational view of the same. As will be seen from these Figures, a residual matter discharge sleeve 75 having a ]-shaped front elevation and extended horizontally in the tangential direction to the inner surface of the squeezing case 13 is formed at one upper side of the end portion of the squeezing case 19. A residual matter outlet opening 19 is formed in the peripheral wall of the case body 13 within the discharge sleeve 75. An adjusting plate 76 is provided in the residual matter discharge sleeve 75 in such a manner as to be able to slide along the outer periphery of the squeezing case 13 thereby to permit the adjustment of the opening area of the residual matter outlet opening 19. The sliding surface of this adjusting plate 76 is curved to follow the curvature of the outer peripheral surface of the squeezing case 13, and is provided at its upper end with an outwardly bent upper face 76a integral therewith, as well as reinforcing ribs 76h, 76h at the front and rear ends thereof.

As will be seen from FIG. 15, a leg 77 unitarily projecting from the lower face of the knob 77 is fitted into the engaging hole 76c formed in the upper face 76a. The leg 77a has an engaging step 77b adapted to engage a rib 76a which is formed to project horizontally from the outer surface of the adjusting plate 76, thereby to unite the adjusting plate 76 and the knob 77 with each other.

Furthermore, the leg 77a of the knob 77 is engaged by a guide-groove 78 which is formed in the upper face of the residual matter outlet opening 19, and opens in the rear end of the residual matter discharge sleeve 75, such that the knob 77 projects above the guide groove 78. At the same time, a projection 79 acting as a stopper is formed near the open end of the guide groove 78.

A reference numeral 80 denotes a residual matter receiving vessel in the form of a closed container, adapted to be placed on the supporting bed 5 of the base 1 in a manner as shown in FIG. 2. The discharge sleeve 75 projecting from the squeezing case 13 projects into the opening 81 which opens at the front side of the side plate of the squeezing case 13, so that the residual matter receiving vessel 80 is clamped between the supporting bed 5 and the residual matters discharging sleeve 75. At the same time, the rear end surface of the residual matter receiving vessel 80 abuts the front end surface of the motor section 2 of the base 1, so that it is prevented from being dropped during the use of the apparatus, as well as during handling of the same.

Alternatively, the residual matter receiving vessel 80 may be suspended with its opening 81 fitted to the residual matter discharge sleeve 75.

A reference numeral 84 designates a juice vessel which is also mounted on the supporting bed 5 of the base 1, with its upper opening positioned beneath the juice outlet opening 17 formed in the squeezing case 13. A skirt 83 is formed on the portion of the squeezing case 13 around the juice outlet opening 17 to extend downwardly therefrom, thereby to prevent the juice from being scattered. This skirt 83 has a size substantially equal to that of the opening of the juice vessel 84 and serves to prevent dust or other foreign matter from coming into the vessel 84.

The motor 7 is adapted to operate in the forward or reverse direction as a switch (not shown) is closed in an appropriate direction. As hereinafter explained, a reversing circuit is formed just before the opening of the switch.

The apparatus of this embodiment having the construction described heretofore is used in a manner explained hereinunder.

The lid 25 is screwed into the open base end of the case 13, and is tightened until the locating projections 23, 31 come into engagement with each other, due to the screwing engagement between the threaded portion 22 of the case 13 and the screw thread 30 of the lid 25. The rotation prevention seat 33 of the lid 25 is located in relation to the inlet opening 14 of the casing 13 by the mutual engagement between the projections 23, 31.

Then, with the rotation prevention seat 33 aligned with the rotation prevention engaging surface 61, the fitting sleeve 32 of the lid 25 is fitted into the clamp case body 54. In consequence, the engaging guide surface 35 comes into engagement with the engaging surface 66a of the clamp body 66, so that the fitting sleeve 32 comes to fit the tubular portion 59 of the clamp case 54 while moving the clamp body 66 back overcoming the force of the spring 67. Upon reaching the position of the retainer hole 34 of the lid 25, the clamp body 66 is moved ahead by the force of the spring 67, so that the clamp body 66 is brought into engagement with the retainer hole 34. During this operation, the clamp body 66 is safely guided by one side of the retainer hole 34 and the guide hole 62 into engagement with the retainer hole 34, by means of the inclined guiding surfaces 34a, 63. Once the lid 25 is fitted, the latter is prevented from rotating due to the mutual engagement between the rotation prevention seat 33 and the rotation prevention engaging surface 61, so that the fitting sleeve 32 of the lid 25 is held in engagement with the tubular portion 59 of the clamp case body 54 while the engaging step 32a is engaged by the step 60 of increasing diameter. At the same time, the engaging projections 24 of the squeezing case 13 engage the engaging recesses 65 of the clamp case body 54, so that the gear case 8 on the base 1, squeezing case 13 and the lid 25 are correctly located in relation to one another, and the squeezing case 13 is held with its throwing opening directed upwardly. In this state, the rotary shaft 38 is connected to the drive shaft 9 through the coupling portions 10, 39, in such a state that the coupling portion 39 of the rotary shaft 38 abuts the inner end of the coupling portion 10 of the drive shaft 9, so that the rotary shaft 38 is prevented from moving toward the base end thereby to preserve the space 27a between the base end surface of the rotary member 36 and the bearing 27. In this state, the squeezing case 13 is supported by the supporting bed 64 of the clamp case body 54 in a horizontal position.

The motor 7 is started as the switch is closed. The drive shaft 9 is driven by the motor 7 at a reduced speed through the gear transmission mechanism. In consequence, the rotary shaft 38 is rotated through the engagement between the coupling portions 10, 39.

The material to be processed is then inlet into the case through the inlet opening 14, and is pressed downward by the pushing rod 16, so that the material is cut and crushed by the cooperation between the cutting blade portion of the rotary member 36 and the edge of the opening 14, and is progressively transferred toward the end of the rotary member by the spiral cutting blade portion 40. The cut material is then forced onto the pressing portion 41 which has a spiral blade 45 extending continuous from that of the spiral cutting blade portion 40. In this pressing portion 41, since the difference of the diameter between the valley 36 and crest 47 is successively decreased toward the outlet end, the material is progressively crushed into smaller pieces so that the expelled liquid content is discharged through the juice outlet opening 17 and through the small holes in the filter 18. The liquid content, i.e. the juice, then drops into the juice vessel 84. In the meantime, the residual matter, including fibers is discharged into the residual matter receiving vessel 80. It will be seen that the residual matter outlet opening 19 is positioned at one side of the squeezing case 13, at such a position as to be downstream from the juice outlet opening 17 as viewed in the direction of rotation of the rotary member 36. Therefore, the residual matter is discharged through the residual matter outlet opening 19 only after the extraction of the juice through the juice outlet opening 17. Then, the residual matter is discharged concentrically without absorbing the juice, so that the extraction of the juice is done at a high efficiency.

The material to be processed is progressively crushed and pressed as it moves through the gap between the inner peripheral surface of the squeezing case 13 and the pressing portion 41 of the rotary member 36, and is further crushed into smaller pieces by the projections 48 in the pressing portion 41 thereby to perform the crushing of cells of the material to further improve the juice extraction efficiency.

If the pitch c of the spiral blade of the cutting blade portion 40 beneath the material inlet opening 14 is smaller than the inside diameter d of the opening 14, the material having a size substantially equal to that of the opening 14 will not be received by the valley between adjacent ridges of the spiral blade. In such a case, it is not possible to transfer the material by the spiral cutting blade portion 40. It is, therefore, necessary that the spiral cutting blade portion 40 beneath the material inlet opening 14 have a pitch c greater than the inside diameter d of the opening 14. The material cut by the cutting blade portion 40 is progressively forwarded by the spiral crest 44 of the rotary member toward the pressing portion 41 having the spiral blade 45 continuous from that of the cutting blade portion 40, and is progressively pressed and crushed in the valley between the inner surface of the squeezing case 13 and the valleys of the rotary member 36. The extracted liquid content, i.e. the juice, is discharged to the juice outlet opening 17 through the small holes in the filter 18, and is finally collected in the juice vessel 84. It will be seen that, since the pitch of the spiral blade 45 of the pressing portion 41 is gradually decreased, and since the difference a of the crest of the blade 45 and the diameter b of the valley is gradually decreased, the volume of the pressing portion 41 is successively decreased. In consequence, although the volume of the crushed material is progressively decreased as it moves toward the outlet side, the speed of movement is successively decreased to afford a longer squeezing time and stronger squeezing force, so that the liquid containing the pulp is well separated from the fibrous matter. Furthermore, since the constant gap a between the inner peripheral surface of the squeezing case and the spiral blade 45 is small, the material can be crushed as much as possible and, at the same time, the small projections 48 formed in the pressing portion 41 act to further crush the material into finer pieces while preventing slipping of the material. It is also to be noted that the rotary member 36 is retracted as it is rotated to effect a pressing of the material within the squeezing case having narrowed end, so that a clearance is formed between the end surface of rotary member 36 and the inner periphery of the end of the case 13, so that, when the residual matters happen to come into this gap, the residual matter is discharged through the discharge opening 19 by the action of the discharging blades 52 provided on the outer surface of the end plate 37.

The fibrous residual matter after the extraction of the juice is transferred to the end of the rotary member 36 and is discharged into the residual matter receiving vessel 80 through the residual matter outlet opening 19 and via the residual matter discharge sleeve 75. It is possible to adjust the opening area of the outlet opening 19 by gripping the knob 77 of the adjusting plate 76 facing the outlet opening 19 and sliding the adjusting plate 76.

For instance, when the material to be processed has a large water content as is the case of water melon, tomato or the like, the adjusting plate 76 is slid fowardly to reduce the opening area of the outlet opening 19, thereby to increase the squeezing time and to increase the squeezing force, so that fine pulp is extracted together with the juice through the small holes in the filter 18. On the contrary, in the event that the material contains a large amount of fibrous matter, the adjusting plate 76 is moved backward to increase the opening area of the outlet opening 19 thereby to promote the discharge of the fibrous residual matter.

In addition, since the rotary member 33 is mounted horizontally on the base 1, the juice is collected through the juice outlet 17 formed at the lower side of case 13 while the residual matter is forwarded axially toward the end, so that the separation of the juice from the solid matter is made in an efficient manner. In addition, flowing of the residual matter and the juice toward the base 1 is avoided, so that the motor 7 and the transmission mechanism section 3 are protected from invasion by the wet residual matter and the juice.

The portion of the squeezing case 13 around the material inlet opening 14 is supported by the supporting bed 64 of the clamp case body 54, so that the pressure exerted by the pushing rod 16 is born by the supporting bed 64. In consequence, the case 13 is held stably to permit a stable processing operation.

When the motor 7 is stopped by a switch actuation after the completion of a juicing operation, the motor 7 is temporarily reversed by the actuation of the switch, so that the material pieces which have come into the gap between the inner peripheral surface of the case 13 and the cutting blade portion 40 and pressing blade portion 41 of the rotary body 36 are moved toward the base end of the case 13 having larger diameter, thereby to facilitate the withdrawal of the rotary member 36.

As the releasing member 71 is depressed by a manipulation of the push button 74 after the completion of the processing operation, the operating surface 70 of the releasing member 71 presses the operated surface 69 of the clamp body 66, so that the latter is pushed against the force of the spring 67 so as to be disengaged from the engaging hole 34 of the lid 25. In this state, it is possible to detach the lid 25 of the case 13 from the clamp case body 54.

Then, after the removal of the lid 25 from the case 13 demounted from the base 1, the rotary member 36 is gripped by hand at its knob 50 projecting from the opening of the case 13, and is pulled to be withdrawn from the opening without substantial difficulty.

In the rinsing operation, the leg 77a of the knob 77 is withdrawn together with the adjusting plate 76 from one end opening of the guiding groove 78, so as to facilitate the rinsing of the residual matters discharge sleeve 75 and the residual matters outlet opening 19.

FIG. 16 shows in section the squeezing case 13 of another embodiment, in which the valley portion 46a of the pressing portion 41 of the rotary body is increased at the portion thereof just upstream from the residual matter outlet opening or port 19, so that the clearance between the inner peripheral surface of the squeeze case 13 and the valley portion 46a is abruptly increased in the area just upstream from the residual matter outlet opening. By so doing, the material is moved relatively smoothly to the area just upstream from the residual matters outlet opening 19 and, as the material reaches the valley portion 46a of increased diameter, the juice remaining still in the residual matter is extracted, while avoiding retention of the residual matters in the case 13, thereby to prevent the generation of abnormal pressure in the case 13 due to retention of the residual matter in the case 13.

FIG. 17 shows another embodiment which is arranged to promote the crushing of the material by the rotary member 36. In this embodiment, a plurality of cutting projections 85 are formed in the valleys 43 between the crests 44 of the cutting blade portion 40. The cutting edges of the crests 44 of the cutting blade portion 40 are arranged to oppose in a direction tangent to the spiral. In this embodiment, the material centering into the case 13 through the material inlet opening 14 is progressively cut by the cutting blade portion 40 in accordance with the height of the blade and is transferred toward the end along the valley 43 while being pressed by the projections 85. Thus, the material is crushed also by the projections 85 as it is slid forwardly along the valley 43, so that finer crushed pieces of the material are obtained to facilitate the extraction of the juice. In addition, the crushing or cutting load is evenly shared by all portions of the cutting blade portion to relieve the portion of the cutting blade portion 40 beneath the material inlet opening 14 from an excessively heavy load. In consequence, the juice is extracted stably and at a higher efficiency.

Figure 18:
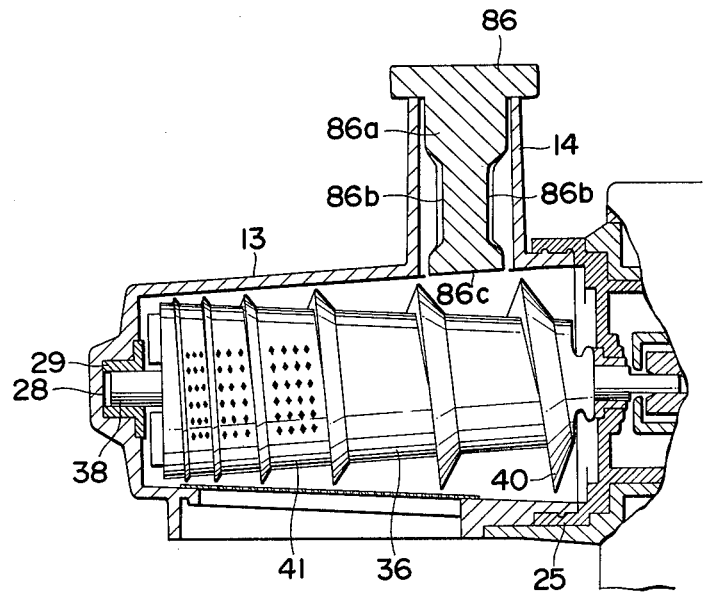
FIG. 18 is a longitudinal sectional view of a squeezing case constructed in accordance with another embodiment of the invention.
Figure 19:
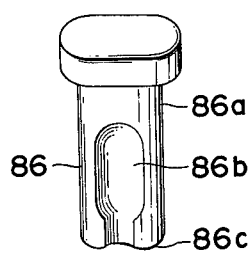
FIG. 19 is a perspective view of a push rod incorporated in another embodiment of the invention.
Figure 20:
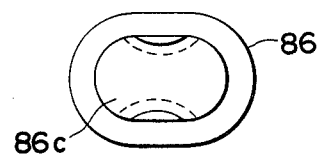
FIG. 20 is a bottom plan view of the push rod.

FIGS. 18 to 20 in combination show a modification arranged for preventing blow back from the material inlet opening 14. In this modification, a recess 86b is formed over both side surfaces via the bottom surface of the insertion portion 86a of the pushing rod 86. The recess 86b has a reduced depth at the bottom surface 86c. The difference of the depth between the intermediate portion of the insertion portion 86 and the bottom face 86c of the same is preserved to avoid excessive driving of the material to the bottom, because the arrangement is such that the material is pressed toward the lower side.

By adopting this construction of the pushing rod 86, blowing back of the juice through the material inlet opening 14 is avoided even when the juice fills the case 13 to the level of a portion of the material inlet opening 14, because the juice is conveniently received by the recess 86b of the push rod 16.

Figure 22:
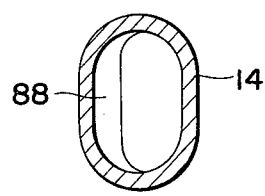
FIG. 22 is a cross-sectional view of the material inlet portion shown in FIG. 21.
Figure 21:
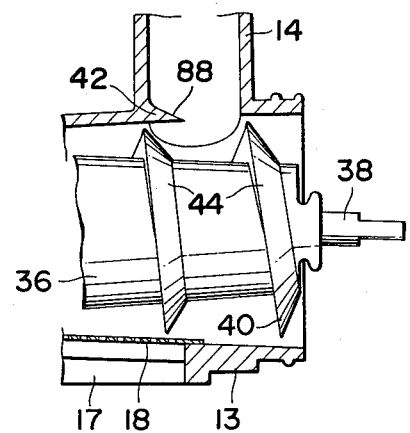
FIG. 21 is a longitudinal sectional view of a material inlet portion of the squeezing body in accordance with another embodiment.

FIGS. 21 and 22 show another example of the material inlet opening 14, in which an arcuate cutter 88 is provided along the inner periphery of the opening of the material inlet opening 14 closer to the case 13, so as to project toward the base 1. In this embodiment, as the material to be processed is admitted into the case 13 through the material inlet opening 14 while rotating the rotary member 36, the material is cut quite easily with reduced load by the cutter 88 under the opening 14, as the material is moved toward the outlet end. In consequence, the level of the load imposed on the motor 7 is remarkably reduced and the admission of the material from the material inlet opening is made in quite a smooth manner. The arcuate shape of the cutter 88 is not exclusive, and the cutter can have any other suitable shape.

What is claimed is:

1. An apparatus for separating liquid and residual matter from a material comprising:

a case having upper, lower and lateral sides and opposite end walls and having a conical imperforate bore closed at opposite ends and with the axis thereof extending horizontally, said case being provided on the upper side with a material inlet opening communicating with the wider end of said conical bore, on the lower side with a juice outlet opening communicating with said bore below said axis, and on a lateral side with a residual matter outlet opening communicating with said bore near the narrower end thereof and above said axis, said case having a filter for and located below said juice outlet opening;

a rotary member rotatably mounted in said bore and having a conical portion and a spiral blade formed on the periphery of said conical portion, said conical portion having a diameter which increases in size proceeding in a direction toward the narrower end of said conical bore, the space between the periphery of said conical portion and the inner peripheral surface of said conical bore decreasing in size proceeding in a direction toward the wider end of said conical portion, said spiral blade having a pitch which decreases as it proceeds toward the narrower end of said conical portion, said spiral blade having a crest which is spaced a constant distance from the inner peripheral surface of said conical bore, and which is spaced an increasing distance from the periphery of said conical portion proceeding in the direction toward the narrower end of said conical portion, that part of said spiral blade near said material inlet opening cooperating with the edge thereof to provide a cutting blade portion disposed near said material inlet opening and that part of said conical portion of said rotary member confronting said juice outlet opening and confronting said residual matter outlet opening defining a pressing portion; and means for rotatably driving said rotary member so as to cut said material into pieces, to move said pieces from the wider to the narrower end of said conical bore, to squeeze said pieces to expel said liquid therefrom, and to expel said residual matter through said residual matter discharge opening.

2. Apparatus according to claim 1 further comprising a plurality of projections formed on the peripheral surface of said conical portion of said rotary member serving as said pressing portion between the crests of said spiral blade, said projections having smaller height than the adjacent blade crest.

* * * * *